(12) United States Patent
Contillo, III et al.

(10) Patent No.: US 8,627,599 B2
(45) Date of Patent: Jan. 14, 2014

(54) PLANTING POT DISPLAY SYSTEM

(75) Inventors: Lawrence J. Contillo, III, Weaverville, NC (US); Charles F. Zala, Cleveland, NC (US); Fabian Eduardo Saenz, Miami, FL (US)

(73) Assignee: Costa Farms, LLC, Goulds, FL (US)

( * ) Notice: Subject to any disclaimer, the term of this patent is extended or adjusted under 35 U.S.C. 154(b) by 233 days.

(21) Appl. No.: 12/888,054

(22) Filed: Sep. 22, 2010

(65) Prior Publication Data

US 2012/0066970 A1  Mar. 22, 2012

(51) Int. Cl.
*A01G 9/02* (2006.01)
(52) U.S. Cl.
USPC ............................................. 47/87
(58) Field of Classification Search
USPC ............... 47/65.5, 66.1, 66.5, 66.6, 85–87; D6/556, 558; D11/143, 144, 155
IPC ....................................................... A01G 9/02
See application file for complete search history.

(56) References Cited

U.S. PATENT DOCUMENTS

| | | |
|---|---|---|
| 1,850,369 A | 3/1932 | Andrews |
| 2,001,798 A | 5/1935 | Schrieber |
| 3,006,461 A | 10/1961 | McGinnis |
| 3,142,133 A | 7/1964 | Brooks |
| 3,825,126 A | 7/1974 | Pohl et al. |
| 3,866,351 A | 2/1975 | Cobia |
| D235,909 S | 7/1975 | Insalaco |
| 3,896,587 A | 7/1975 | Insalaco |
| 3,951,259 A | 4/1976 | Oglesbee |
| D243,112 S | 1/1977 | Gross |
| 4,050,579 A | 9/1977 | Gorski et al. |
| 4,173,097 A | 11/1979 | Staby |
| D255,410 S | 6/1980 | Petruzzi et al. |
| 4,242,834 A | 1/1981 | Olsen |
| 4,296,569 A | 10/1981 | Edwards |
| 4,618,069 A | 10/1986 | Quong |
| 4,684,013 A | 8/1987 | Jacobs |
| 4,700,837 A | 10/1987 | Hammett |
| 4,739,581 A | 4/1988 | Jarvis |
| D297,601 S * | 9/1988 | Grossman et al. ............. D6/556 |
| 4,887,388 A | 12/1989 | Waltel, Jr. |
| D306,043 S | 2/1990 | Hickmott |
| 4,928,841 A | 5/1990 | Arthurs |
| D309,159 S | 7/1990 | Hickmott |
| D311,215 S | 10/1990 | Hickmott |
| 4,962,855 A | 10/1990 | Holmquist |
| 4,964,514 A | 10/1990 | Wycech |
| 4,987,723 A | 1/1991 | Diemer |

(Continued)

FOREIGN PATENT DOCUMENTS

| | | |
|---|---|---|
| FR | 2649582 | 1/1991 |
| GB | 2060342 | 5/1981 |

(Continued)

*Primary Examiner* — David Parsley
*Assistant Examiner* — Danielle Clerkley
(74) *Attorney, Agent, or Firm* — Springut Law PC

(57) ABSTRACT

A planting pot system is provided. In the system, a multi-compartment tray that contains compartments that have either no vertical planes of symmetry or only one vertical plane of symmetry causes pots that have either one vertical plane of symmetry or no vertical planes of symmetry to be limited or precluded from being rotated and consistently urged into a place in only one orientation. Through this system efficient and effective orienting of and displaying of the contents of the pots may be achieved.

25 Claims, 7 Drawing Sheets

(56) References Cited

U.S. PATENT DOCUMENTS

| | | | |
|---|---|---|---|
| 5,022,183 | A | 6/1991 | Bohlmann |
| D322,707 | S | 12/1991 | Iverson |
| 5,076,011 | A | 12/1991 | Stehouwer |
| D323,415 | S | 1/1992 | Iverson |
| D323,416 | S | 1/1992 | Iverson |
| D324,659 | S | 3/1992 | Steuhouwer |
| 5,094,060 | A | 3/1992 | Caird |
| 5,170,712 | A | 12/1992 | Stehouwer |
| 5,180,052 | A | 1/1993 | Smith et al. |
| 5,327,679 | A | 7/1994 | Hawthorne |
| 5,339,517 | A | 8/1994 | Diemer |
| 5,353,930 | A | 10/1994 | Berry, Jr. |
| 5,417,432 | A | 5/1995 | Dwyer |
| 5,467,524 | A | 11/1995 | Diemer |
| 5,481,825 | A | 1/1996 | Aoyama |
| 5,644,867 | A | 7/1997 | Gay |
| 5,813,534 | A | 9/1998 | Schamante |
| 5,836,447 | A * | 11/1998 | Garcia et al. ............... 206/423 |
| D402,863 | S | 12/1998 | Hickmott |
| 5,884,767 | A | 3/1999 | Peng |
| 5,953,859 | A | 9/1999 | Cochran et al. |
| 5,992,650 | A | 11/1999 | Lord |
| D427,639 | S | 7/2000 | Hickmott |
| D428,445 | S | 7/2000 | Hickmott |
| 6,085,460 | A | 7/2000 | Jackson |
| 6,102,204 | A | 8/2000 | Castleberry |
| 6,145,233 | A | 11/2000 | Hickmott |
| D437,618 | S | 2/2001 | Faulkner |
| 6,199,319 | B1 | 3/2001 | Skinner |
| D443,310 | S | 6/2001 | Faulkner |
| 6,269,964 | B1 | 8/2001 | Turner, Jr. |
| 6,339,899 | B1 | 1/2002 | Lehmann |
| D454,162 | S | 3/2002 | Hickmott et al. |
| 6,367,645 | B1 | 4/2002 | Trygg |
| 6,453,613 | B1 | 9/2002 | Gratz |
| 6,478,167 | B1 | 11/2002 | Burgess |
| 6,526,693 | B2 | 3/2003 | Cochran |
| D480,660 | S | 10/2003 | Faulkner |
| 6,736,267 | B2 | 5/2004 | Schamante |
| D501,514 | S | 2/2005 | Garza |
| 6,851,221 | B2 | 2/2005 | Layt et al. |
| D502,669 | S | 3/2005 | Smith et al. |
| 7,076,900 | B2 | 7/2006 | Faulkner |
| 7,454,864 | B2 | 11/2008 | Smith et al. |
| 2001/0054570 | A1 | 12/2001 | Danko |
| 2002/0066227 | A1 | 6/2002 | Wood-Phillips |
| 2003/0144853 | A1 | 7/2003 | Stehouwer et al. |
| 2003/0177675 | A1 | 9/2003 | Faulkner |
| 2003/0183140 | A1 | 10/2003 | Layt |
| 2003/0217949 | A1 | 11/2003 | Schamante |
| 2004/0024637 | A1 | 2/2004 | Faulkner |
| 2005/0172530 | A1 | 8/2005 | Huffman |
| 2006/0117628 | A1 | 6/2006 | Faulkner |
| 2008/0093242 | A1 | 4/2008 | Rosendall |
| 2009/0173003 | A1 * | 7/2009 | Mayes, Jr. ............... 47/79 |
| 2009/0260285 | A1 * | 10/2009 | Smith et al. ............... 47/86 |

FOREIGN PATENT DOCUMENTS

| | | |
|---|---|---|
| GB | 2069804 | 9/1991 |
| GB | 2263052 | 6/1994 |
| JP | 58146447 | 10/1983 |
| JP | 61148161 | 9/1986 |
| JP | 174743 | 5/1989 |
| JP | H5308853 | 11/1993 |
| JP | 661042 | 8/1994 |
| JP | 9577372 | 2/1995 |
| JP | 920366 | 1/1997 |
| JP | 10178919 | 7/1998 |
| JP | 2001136835 | 5/2001 |
| JP | 200245046 | 2/2002 |
| WO | WO9319446 | 9/1993 |

* cited by examiner

PLANTING POT DISPLAY SYSTEM

FIELD OF THE INVENTION

The present invention relates to planting pots and multi-compartment trays for holding them.

BACKGROUND OF THE INVENTION

Plants are often offered for sale in pots that have simple and regular three-dimensional shapes. The most common of these pots have circular horizontal cross-sections. When displaying these pots and the contents of them to customers, vendors often use multi-compartment trays. By using multi-compartment trays, vendors can conveniently transport a plurality of pots from one location to another, and also consistently group together plants of similar types.

Because most known pots have circular cross-sections, the trays that carry them typically have compartments that have circular cross-sections as well. Unfortunately, when the pots and compartments both have circular cross-sections, the pots can easily rotate and thus their orientation may change or shift during transport. Further, even if a vendor is able to orient a plurality of pots in a manner that he desires when he sets up a display, customers may take the pots out of the tray and then put them back in a different orientation. Thus, if a vendor wishes for a certain perspective of a plant or pot to be displayed consistently to its customers, each time that the pot rotates or is turned by a customer after the customer picks it up and puts it back down, an employee of the vendor may need to re-orient the pot in order to have the desired perspective shown.

Similarly, when pots are provided with identification tags, including those that identify a plant or its price, and are placed in the trays, a vendor may wish for the tag to be visible and oriented toward the perimeter of the tray. However, for the reasons noted above, under common systems, frequently a vendor must manually re-orient its pots so that the identification tags are all facing in a desired direction.

The various embodiments of the present invention address one or more of the aforementioned short-comings of present technologies and systems.

SUMMARY OF THE INVENTION

The present invention is directed toward systems for orienting pots in trays that contain them. Through the use of the systems and components of these systems, one may more easily and more efficiently cause planting pots to be placed in and maintained in a desired orientation.

According to an embodiment of the present invention there is a plant display system comprising: (a) a plurality of pots, wherein each pot has a bottom portion and a body portion, wherein the body portion has an outer shape and has no more than one vertical plane of symmetry; and (b) a multi-compartment tray having a plurality of compartments, wherein at least one compartment has no more than one vertical plane of symmetry and wherein each compartment has an inner shape and at least one pot is nested within a compartment of said tray and the sides of the compartment prevent the pot from rotating any more than 30 degrees in either a clockwise or counter-clockwise direction.

Through the use of the various embodiments of the systems of the present invention, one may see one or more of the following benefits: ease of transport of a plurality of planting pots; prevention of rotation of planting pots while in the trays; ease of inserting a planting pot in a tray in a desired orientation; and efficient systems for displaying labels.

DETAILED DESCRIPTION OF THE INVENTION

Figure 1:
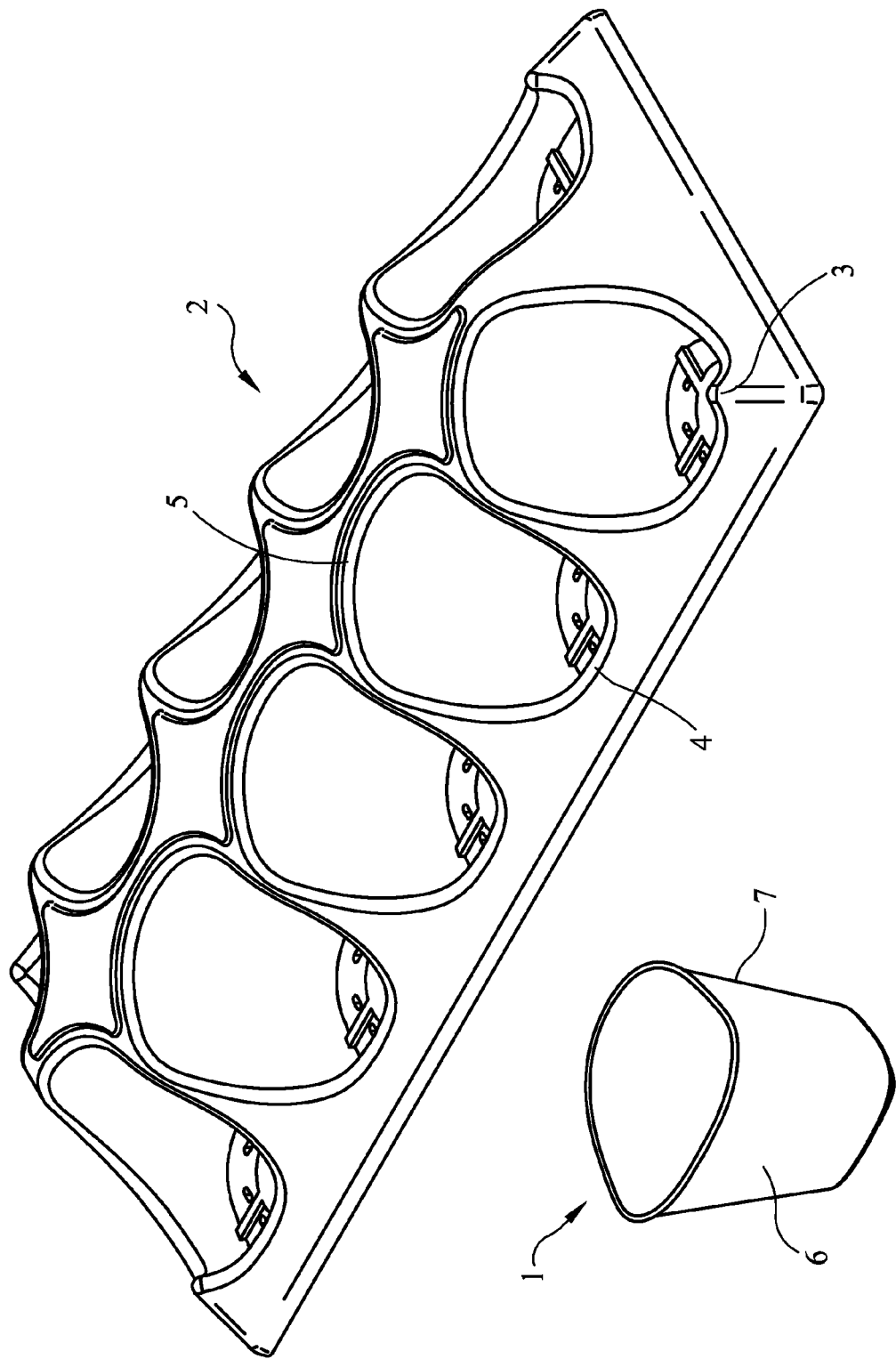
FIG. 1 is a representation of a pot and multi-compartment tray of the present invention, each from first perspective view.

The present invention relates to planting pots (also referred to herein as pots) and a multi-compartment tray for use with the planting pots. The pots and tray each have a configuration for urging the pots into proper alignment and retaining the pots in that alignment. The term "urging" refers to the positioning of a pot within a compartment and is accomplished when a person begins to insert the pot in the lumen of a compartment, and after gravity or an external force is applied (or both are applied), the pot is, due to the configuration of the pot and compartment, guided into a desired orientation. Each of the aforementioned components may be used separately; however, preferably they are used together.

Each pot may have a regular or irregular shape, and each pot may be defined by a bottom portion, a body portion and a top portion. As persons of ordinary skill in the art are aware, planting pots are designed to define a concave three dimensional space in which contents such as dirt, soil and plants may be placed. Moreover, the present invention includes systems described herein that do not depend on the identity of the contents of the pots, and the invention includes embodiments in which the pots are empty or have contents.

The bottom portion of the pot refers to the portion of the pot that is typically the vertically lowest portion and has a horizontal or substantially horizontal dimension that forms the floor of the pot. A dimension may be "substantially horizontal" even if it contains contours that are raised above or below a horizontal plane of another portion of the bottom of the pot and includes sections that connect two or more areas of the bottom of the pot. Thus, a dimension may be substantially horizontally if it includes recesses and/or elevations.

One face of the bottom portion of the pot is oriented toward the interior of the pot, and the other face of the bottom portion of the pot is oriented toward the exterior of the pot. The body portion of the pot may extend vertically or substantially vertically from the perimeter of the bottom portion of the pot and end at the top portion of the pot, which may for example have a rim. Typically, the perimeter or edge of the bottom of a pot curves upward as the bottom of the pot approaches the body of the pot.

As noted above, in some embodiments, the bottom of the pot contains two or more horizontal sections. When there are two or more horizontal sections, the distance from the highest horizontal portion and the lowest horizontal portion, may for example, be less than two inches, less than one and one-half inches, less than one inch, less than three-quarters of an inch, less than one-half of an inch, less than one-quarter of an inch, less than one-eighth of an inch or less than one-sixteenth of an inch. The different horizontal sections may, for example, be included to facilitate engagement with a configuration in the floor of a compartment of the tray. They may also exist due to imperfections in the pot.

In some embodiments there may be one or more holes in the bottom of the pot. In other embodiments there may be no holes in the bottom of the pot. Still further, in other embodiments the pots may be designed so that the bottom of the pot is completely flat and contains no holes, one hole, two holes, three holes, four holes, five holes, six holes or more holes. These holes may be included to allow for water to drain. Additionally, in some embodiments there may be one or more holes (for example, two holes, three holes, four holes, five holes, six holes or more holes) in the bottom of one, or more, for example all of the compartments. In other embodiments there may be no holes in the bottom of the compartments. The presence, absence or number of holes in the pots may be independent of the presence, absence or number of holes in the compartments. In some embodiments, one may choose to have the same number of holes in the pots and in the compartments.

As used herein, the phrase "substantially vertical" refers to a dimension that deviates from being perpendicular to the horizontal plane by less than 30 degrees. In some embodiments, the deviation from being perpendicular to the horizontal plane is less than 25 degrees, less than 20 degrees, less than 15 degrees, less than 10 degrees, less than 5 degrees, less than 4 degrees, less than 3 degrees, less than 2 degrees, or less than 1 degree. In other embodiments, there is no deviation from being perpendicular to the horizontal plane. For example, the body of the pot may be substantially vertical if its sides are in a range of 60-90 degrees from the horizontal, 75-90 degrees from the horizontal, 75-85 degrees from the horizontal or 85-90 degrees from the horizontal.

The pots are designed such that they have either no vertical planes of symmetry or only one vertical plane of symmetry. The phrase "vertical plane of symmetry" as used herein refers to the feature of one half of a structure being the same as the mirror image of the other half of the structure in a hypothetical vertically placed mirror. Thus, there is a vertical plane of symmetry if the front half of a structure is the same as the mirror image of the back half of the structure or if the left half of the structure is the same as the mirror image of the right half of the structure. There would be two vertical planes of symmetry if both the front half is the same as the mirror image of the back half and the left half is the same as the mirror image of the right half.

By way of example, a three dimensional shape whose horizontal cross section is a square, an ellipse, or a rectangle throughout the entire vertical dimension would have two or more vertical planes of symmetry. If the cross-section is a circle, there may be an infinite number of vertical planes of symmetry. By contrast, a three dimensional shape whose horizontal cross-section is a trapezoid (or a rounded trapezoid, i.e., a trapezoid whose corners are rounded and/or whose opposite sides are slightly rounded so that they are not parallel), would have only one vertical plane of symmetry. An irregular three-dimensional structure would have no vertical planes of symmetry. Thus, a pot or compartment that is a cylinder or shaped like a cone (or a modified cone in which the narrowest portions are absent) has an infinite number of vertical planes of symmetry. In some embodiments, a pot may have a base or bottom portion that is a circle, square, ellipse or rectangle, but sides that do not retain those shapes as they rise vertically. In other embodiments, the base or bottom portion is not a circle, square, ellipse or rectangle and the perimeter of the base is the same shape as the cross-section of the body.

The multi-compartment tray of the present invention has a plurality of compartments. For example, there may be at least two compartments, at least three compartments, at least four compartments, at least five compartments, at least six compartments, at least seven compartments, at least eight compartments, at least nine compartments, at least ten compartments, at least eleven compartments, at least twelve compartments or more compartments. In some embodiments, there are exactly two, three, four, five, six, seven, eight, nine, ten, eleven, or twelve, etc. compartments. The compartments may, for example, be oriented in a single row, in two rows or in more than two rows, e.g., three rows, four rows, five rows, six rows, seven rows, eight rows or more rows. Thus, unless otherwise specified the invention is not limited by the number of compartments, the numbers of rows of compartments, or the configuration of the compartments.

Similar to the pots, at least one compartment, a plurality of compartments or all compartments have no more than one vertical plane of symmetry, i.e., no vertical planes of symmetry or one vertical plane of symmetry. The compartments may have a horizontal or substantially horizontal bottom and a body that define a concave cavity.

The inner surface of the compartment may form an inner shape. In some embodiments, the inner shape of at least twenty percent of the sides of at least one compartment is substantially similar to a portion of the outer shape of at least one pot. For example, at least the lower 20 percent of the sides of the compartment, or at least the lower 30 percent of the sides of the compartment, or at least the lower 40 percent of the sides of the compartment, or at least the lower 50 percent of the sides of the compartment, or at least the lower 60 percent of the sides of the compartment, or at least the lower 70 percent of the sides of the compartment, or at least the lower 80 percent of the sides of the compartment, or at least the lower 90 percent of the sides of the compartment, or at least the lower 95 percent of the sides of the compartment are substantially similar in shape to the outer sides of the pot. As persons of ordinary skill in the art are aware, by designing the outer surface of the pot to be similar to that of the compartment, the pot can easily be urged into the compartment, nest therein and be stable, i.e., not moving an undesirable amount relative to the tray.

In some embodiments, within the compartments there is a uniform height of all sides and all sides are the same height as those of the pots or at least 50%, at least 60%, at least 70%, at least 80%, at least 90%, or at least 95% of that of the pots. In other embodiments, the vertical sides of the body of each compartment are not of uniform height and the highest point of each of the compartments is within one of the aforementioned ranges and the lowest point of the compartment is a height that is at least 20%, at least 30%, at least 40%, at least 50%, at least 60%, at least 70%, at least 80%, at least 90% of that of the pot, but less than that of the highest point of the compartment. For example, the lowest height might be a height that is 20-80% of that of the highest point, 20-50% of that of the highest point or 30-40% of that of the highest point of the compartment. For convenience, the sides or body of a compartment are referred to as having a height measured from the base of the compartment.

When a compartment is not of a uniform height, within a compartment there may be what is referred to as a first height and a second height, wherein the first height is lower than the second height and the first height is the height of the compartment closest to the exterior perimeter of the tray and the second height is the height of the compartment farthest from the exterior perimeter of the tray. The first height may be the lowest height referenced in the previous paragraph, and the second height may be the highest point. The exterior perimeter refers to horizontal edges of the tray.

As noted above, when the sides of the compartment are not of uniform height, the shape of the sides may be defined such that for any portion of a side of the compartment that exists, its shape substantially similar to the shape of the pot. A side of a compartment is substantially similar in shape to that of a pot if in those areas the inner surface of the compartment has the essentially the same three dimension contours as the outer surface of the pot so as to permit the pot to reside therein. Unless otherwise specified, the concept of the having essentially the same three dimension contours includes situations in which all of the contours are exactly the same, as well as those situations in which most of the contour of the pot and the contour of the compartment are the same, but the contours are different over small areas. As will be readily apparent, the compartment will define a space that is larger than the volume of the pot in order to permit easy insertion and removal of the pot.

Additionally, within a tray all compartments may be the same size and designed to house the same sized pots. Alternatively, the compartments within a given tray may be different sizes and thus capable of receiving and facilitating nesting of pots of different sizes. Even if the compartments within a tray are all designed to receive pots that are the same size, the trays may be designed such that the compartments closest to the corners of the trays have a first configuration, wherein the other compartments, if present have a second configuration. The first configuration may be such that compartments have two regions of first heights that are each oriented toward the perimeter of the tray. The second configuration, which may apply to compartments that boarder the sides but not the corners of the tray, may have only one region that has a first height.

The height of the regions of the compartments may be independent of the height of the pots. Thus, even when the sides of a particular compartment are not uniform in height, the sides of a pot that sits in it may all be of uniform height. Thus, a portion of the side of the pot may be visible even when within the tray. The visible portion may be situated closest to the perimeter of the tray.

The compartments and the pots may be designed such that a pot may sit or nest in a compartment, and the system can be utilized wherein each compartment has a pot sitting within it. Alternatively, the system may be used when fewer than all of the compartments have pots sitting within them. Additionally, although the system may be viewed as most efficient when all of the pots and compartments have no more than one vertical plane of symmetry each, and are configured so that the pots may nest in the compartments, it is within the scope of the invention to include embodiments in which there are a plurality of pots and only one, or fewer than all satisfy this criteria. Similarly, it is within the scope of the present invention to develop trays in which only one or a plurality of compartments but not all compartments have no vertical planes of symmetry or one vertical plane of symmetry. Further, although the systems are particularly advantageous when the tray has a plurality of compartments, a tray can be designed consistent with the present invention in which there is only one compartment.

By designing the system such that neither the pots nor the compartments have a plurality of vertical planes of symmetry, rotation of the pots is impeded. Thus, in some embodiments, the pots cannot rotate twist on shift horizontally while sitting in the compartments. In other embodiments, the pots cannot rotate, twist or shift more than 30 degrees, more than 25 degrees, more than 20 degrees, more than 15 degrees, more than 10 degrees, more than 5 degrees, more than 4 degrees, more than 3 degrees, more than 2 degrees, or more than 1 degree, or the pots cannot rotate at all (i.e. it would be able to rotate zero degrees) either clockwise or counter-clockwise. As persons of ordinary skill in the art will appreciate, a pot that can rotate 30 degrees in either a clockwise or counter-clockwise direction has a range of rotation of 60 degrees.

Through the nesting of a pot in a compartment that has similar contours and for which there are no vertical planes of symmetry or only one vertical plane of symmetry (for both the pot and the compartment), the inner sides of each compartment provides a physical barrier against the rotation of the respective pot that sits therein. This physical barrier can prevent rotation independent of any interaction between the bottom of a pot and the bottom of a compartment. To the extent that there is a possibility of a small amount of rotation, this may be due to the amount of space between the pot and the wall of the compartment.

In some embodiments, the outer side of the body of the pot, when the pot is nested within a compartment is 0-20 cm from the inner side of the compartment, 0.01-20 cm from the inner side of the compartment, 0-10 cm from the inner side of the compartment, or 0.01-10 cm from the inner side of the compartment, or 0.01-10 mm from the inner side of the compartment, or 1 mm-6 mm from the inner side of the compartment or 2 mm-4 mm from the inner side of the compartment. Thus, in some embodiments, a pot may sit in a compartment in a manner such that no sides touch a side of a compartment. The aforementioned distances are average distance over the surface of the sides of the compartment and pots for locations where they are coextensive. Thus, they do not include locations in which the pots are visible because the corresponding section of the compartment has ended at the first height or any other height that is lower than the second height.

As noted above, each of said compartments may be defined as having a compartment base and each of said pots has a pot base. In some embodiments the base of each compartment has a first three dimensional contour and the base of each pot has a second three dimensional contour. The first three dimensional contour may have at least one raised element and the second three dimensional contour may have at least one recessed element. (Alternatively, the first three dimensional contour may have at least one recessed element and the second three dimensional contour may have at least one raised element.) The at least one raised element of the first three dimensional contour and at least one recessed element of the second three dimensional contour may be capable of being coupled or when in use actually coupled. The coupling of the bases of a pot and compartment may be used to prevent further rotation. The recesses may engage the raised element and assist in urging and retaining the pot in proper alignment. In other embodiments, the compartment base and the pot base are both smooth or do not otherwise include recesses or protrusions. Thus, the shape of the body of the pot and sides of the compartment may facilitate urging into and retaining proper alignment without the assistance of the aforementioned recesses and raised sections. In other embodiments, one may associate the pot and the compartments through one or more attachment mechanisms such as one or more clips.

In some embodiments each pot may be associated with a label. The label may be affixed to the pot or inserted into the dirt within the pot. If a label is included, it may be associated with a pot so that when the pot is positioned by the self-orienting configuration, the label faces the exterior of the tray.

As persons of ordinary skill will appreciate, the system is not defined by the contents of the pots. However, by way of non-limiting examples, the pots may be used to house flowers, vines, small shrubbery, and other types of plants.

The pots and the trays may, for example, be manufactured of plastic materials, including but not limited to lightweight, plastic materials that are suitable for temporary use by garden centers, gardeners, and the like. The plastic may be molded and shaped by techniques known to persons of ordinary skill in the art. Other natural and synthetic materials may also be used to manufacture the pots and the trays.

Reference to the present invention may be further understood by viewing the accompanying figures.

FIG. 1 is a top perspective view of a pot 1 and multi-compartment tray 2. The pot shown has a rounded trapezoid cross-section that has a rounded longer side 6 and a rounded shorter side 7. The tray shown is capable of holding up to ten pots. Each of the compartments is designed to hold pots that are the same size. In the tray as shown, there are side compartments 5 and corner compartments 3. In this embodiment, the side compartments have a lower side 4 that is oriented toward the outside perimeter of the tray. The corner compartment 3 has two lower sides, one of which is oriented toward a longer side of the perimeter of the tray and the other which is oriented toward a shorter side of the perimeter of the tray. As the shape of the compartments that are shown demonstrate, the pot would sit in a compartment of the tray with the longer side oriented toward the exterior of the tray.

Figure 2:
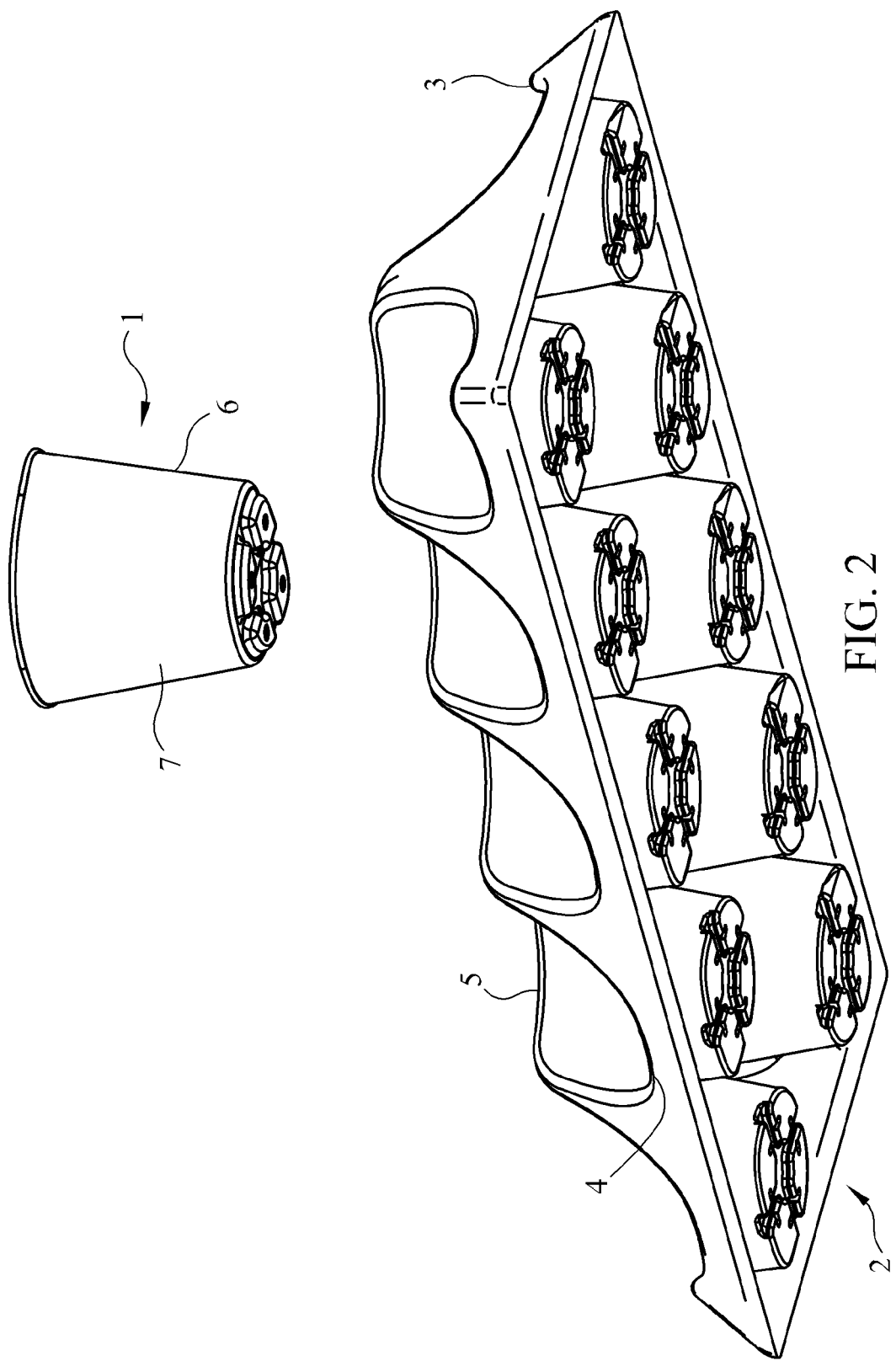
FIG. 2 is a representation of the pot and multi-compartment tray of FIG. 1, each from a second perspective view.

FIG. 2 shows a bottom perspective view of the pot 1 and the tray 2. In FIG. 2, the rounded smaller side 7 of the pot is shown as is the location of the longer side 6. Similarly, the location of a side compartment 5 and a corner compartment 3 are identified. Also shown is an example of a lower exterior facing side of a side compartment 4. Further, FIG. 2 shows the exterior base of the pot, which is contoured to couple with the interior bottom contour of a compartment, which can be seen in FIG. 5.

Figure 3:
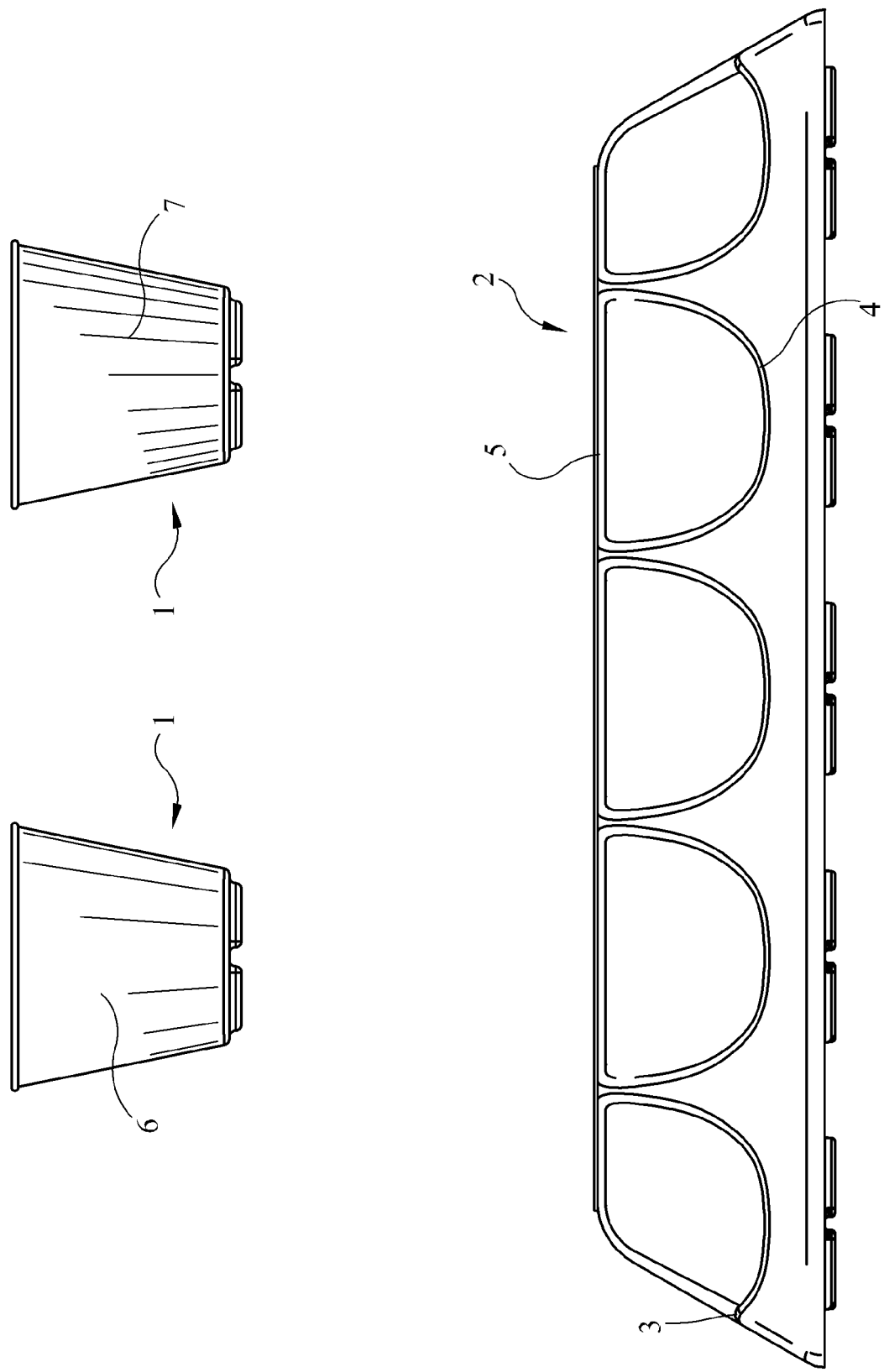
FIG. 3 is a representation of opposite sides of the pot from a front and a rear perspective and the multi-compartment tray of FIG. 1.

FIG. 3 shows two pots 1. One pot shows rounded longer rounded side 6 and the other pot rounded side 7, which has a different steeper curvature. These different shapes demonstrate that there is no vertical plane of symmetry between the front and rear of the pots. Also shown is tray 2 from the front, with reference made to a side compartment 5, a corner compartment 3 and the lower edge of a side compartment 4. A rear view of the tray would appear the same and be same as the mirror image of this figure.

Figure 4:
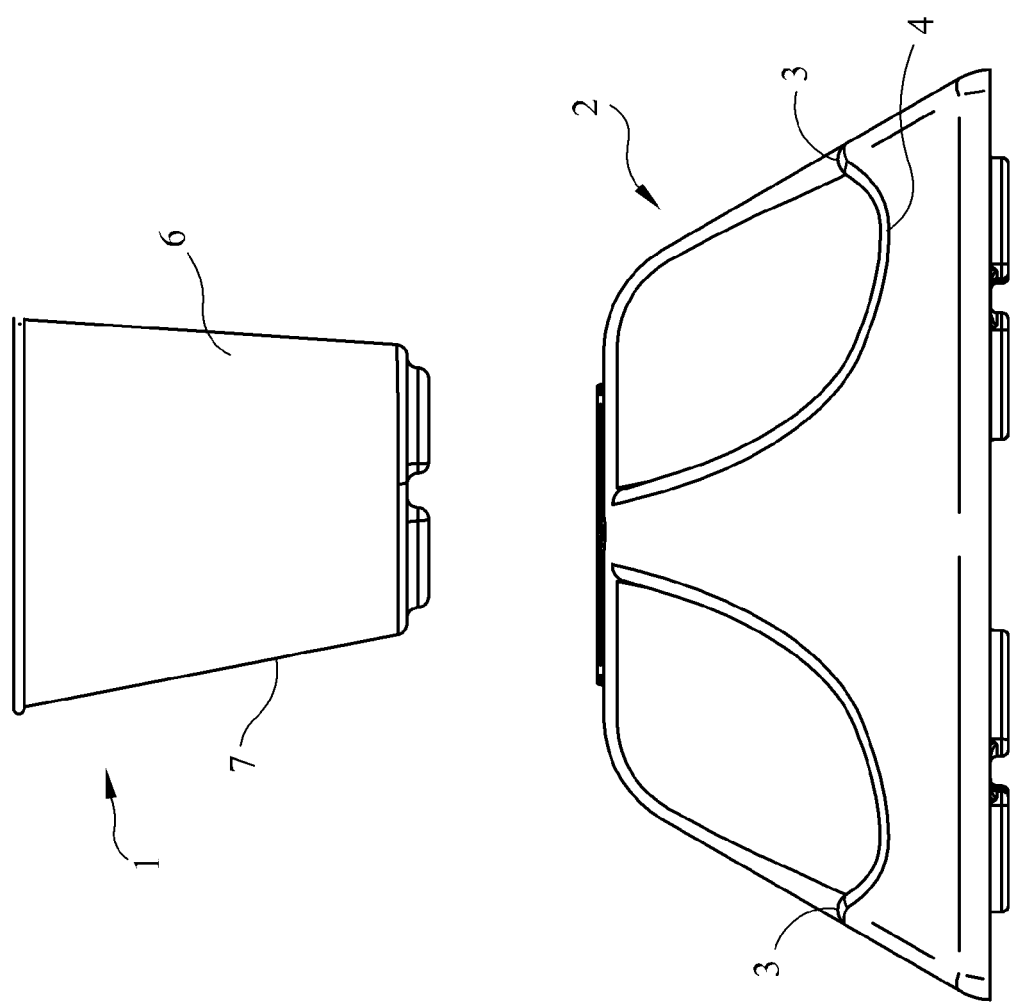
FIG. 4 is a representation of the pot and multi-compartment tray of FIG. 1, each from a side view.

FIG. 4 shows a side view of the tray 2, with reference to corner 3 and a lower edge 4 of a corner compartment. (The opposite side of the tray would be the same as the mirror image of this side.) Also shown in FIG. 4 is a side view of pot 1, with reference being made to the longer side 6 and shorter side 7. (The opposite side of the pot would be the same of the mirror image of this side, and thus there is a vertical plane of symmetry between the sides.)

Figure 5:
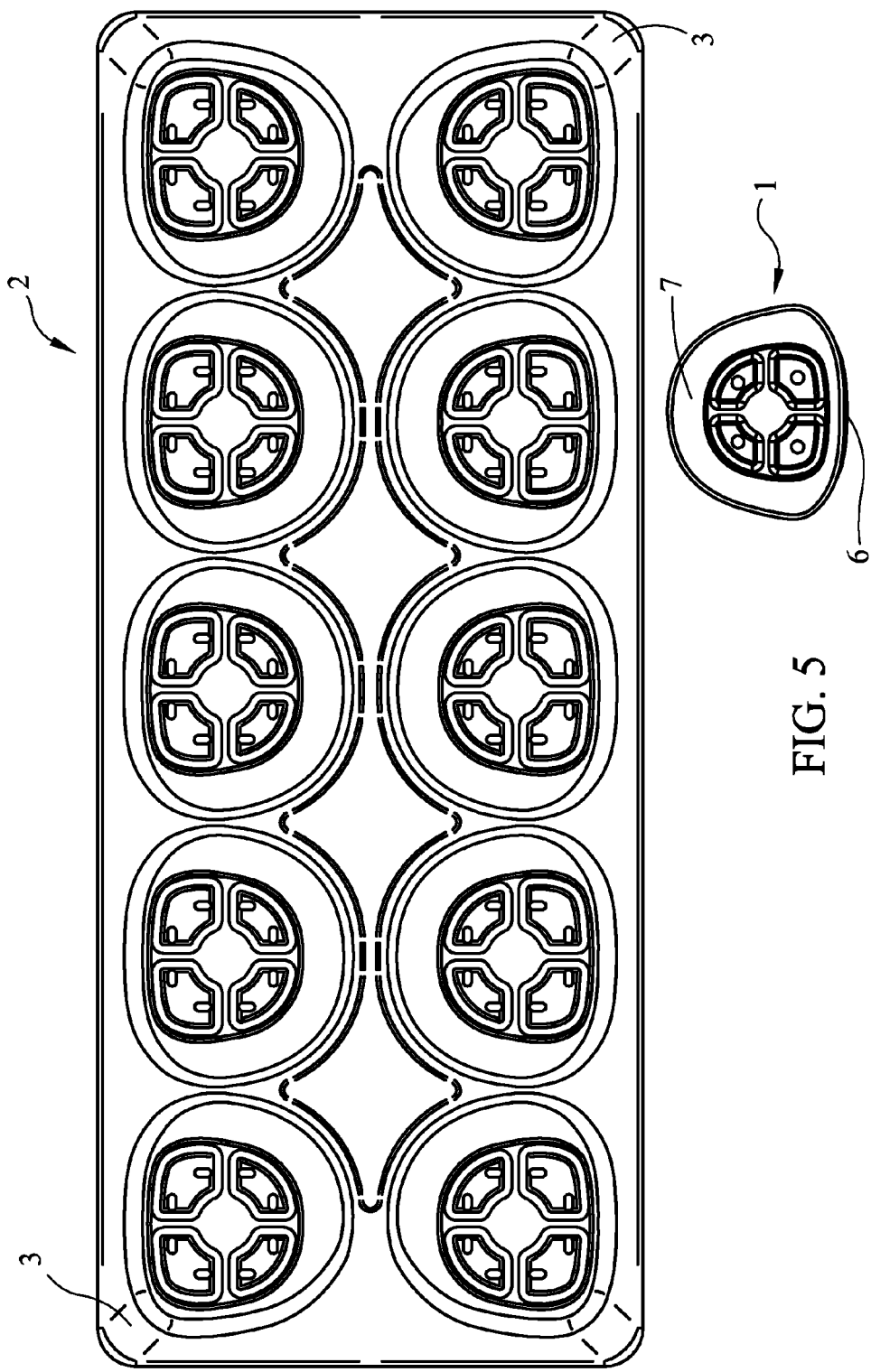
FIG. 5 is a representation of the pot and multi-compartment tray of FIG. 1, each from a top view.

FIG. 5 is a top view of the tray 2 and pot 1. Reference is also made to corner compartment 3 and side compartment 4 of the tray, as well as to the sides 6 and 7 of pot 1.

Figure 6:
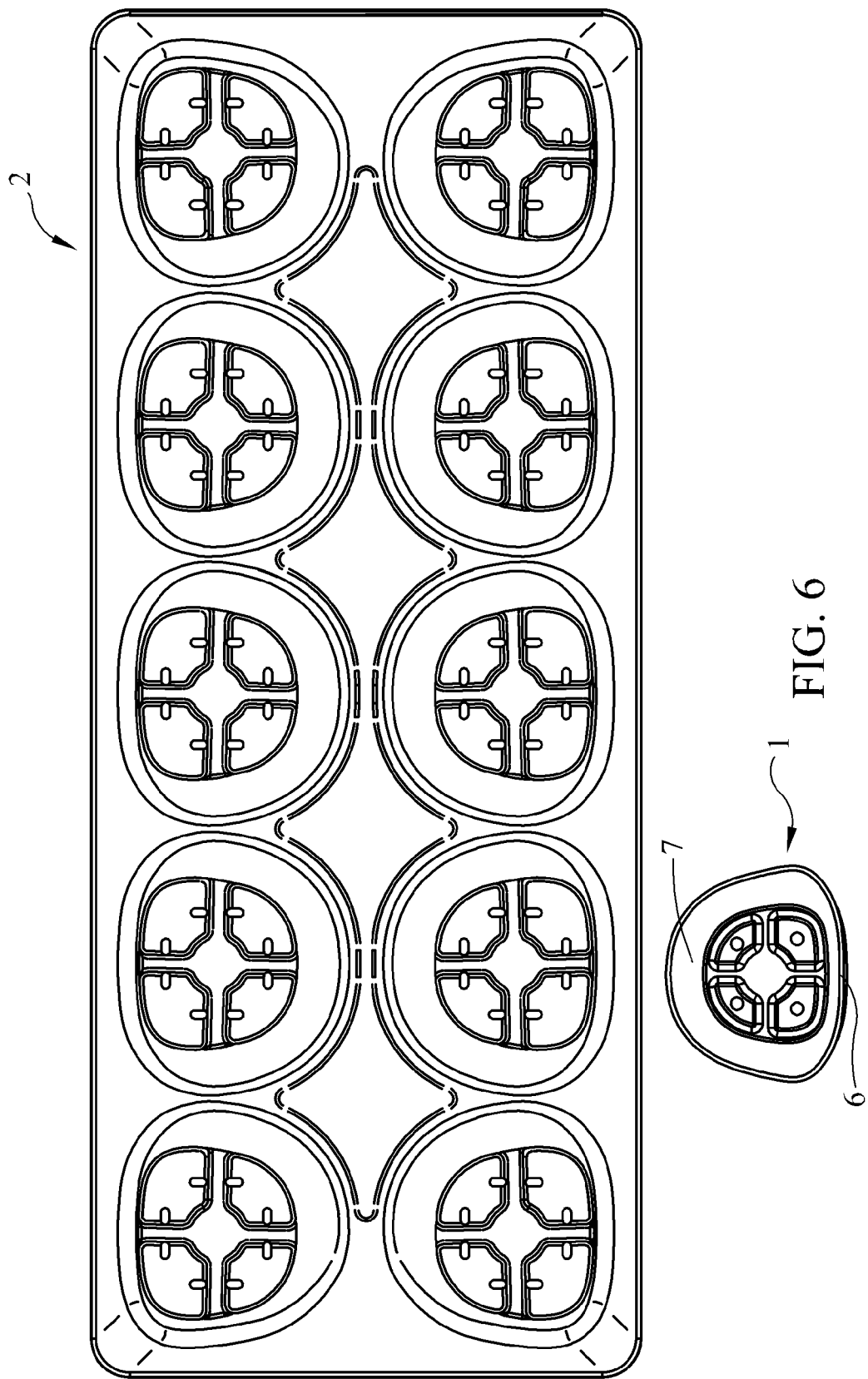
FIG. 6 is a representation of the pot and multi-compartment tray of FIG. 1, each from a bottom view.

FIG. 6 is a bottom view of tray 2 and pot 1. Pot 1 shows the smaller side of the pot 7 and longer side 6 of the pot.

Figure 7:
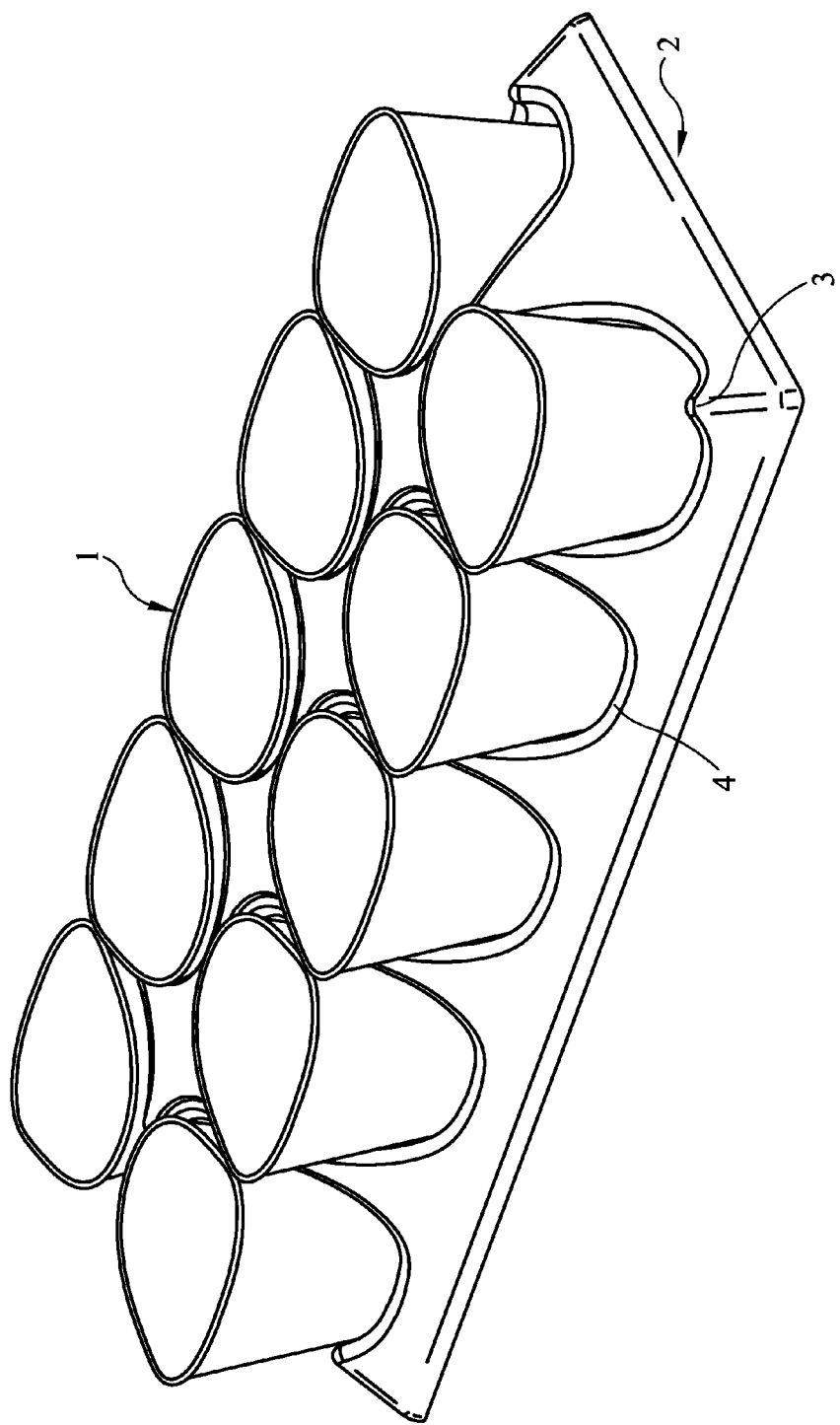
FIG. 7 is a perspective view of a set of pots within a multi-compartment tray.

FIG. 7 shows the system with a pot 1 in each compartment of tray 2. Examples of a side compartment 4 and a corner compartment 3 are identified for reference.

By way of a further non-limiting example, in one embodiment the multi-compartment tray is approximately 20 inches long and approximately 8 inches wide. It contains two rows of five compartments. Each of the six side compartments has one region with a lower first height of about 1¼ inches and a region with a second height of about 3½ inches. Each of the four corner compartments has two regions that each have a lower first height of about 1¼ inches and a region with a second height of about 3½ inches. The sides of the compartment below the areas of the first height have one vertical plane of symmetry and a rounded trapezoid shape.

The pots are approximately 3½ inches deep, have a uniform height throughout and one vertical plane symmetry. They have a shape substantially similar to that of the compartment over the corresponding region for which there are compartment walls. This shape of the pot is a rounded trapezoid at its opening. At the opening, the pot has a length across its longest section of approximately 3 and ⅜ inches and a width across its widest section of approximately 3 and ⅛ inches. Its depth is approximately 3½ inches. When nested, there is approximately 1/16 of an inch between the sides of the pot and the sides of the compartment.

Unless otherwise specified, any of the features of the various embodiments described herein can be used in conjunction with features described in connection with any other embodiment disclosed. Accordingly, features described in connection with the various or specific embodiments are not to be construed as not suitable in connection with other embodiments disclosed herein unless such exclusivity is explicitly stated or implicit from the context.

The invention claimed is:

1. A planting pot display system comprising:
    (a) a plurality of pots, wherein each pot has a bottom portion and a body portion, wherein the body portion has an outer shape and each pot has no more than one vertical plane of symmetry; and
    (b) a multi-compartment tray having a plurality of compartments that each have no more than one vertical plane of symmetry and wherein each compartment has an inner shape, at least one pot is located within a compartment of said tray and is rotatable within said compartment, and said compartment has sides that form a physical barrier that prevents rotation of said pot within a specified range in either a clockwise or counter-clockwise direction, wherein each compartment has a first height and a second height, wherein the first height is the height of a lowest side of the compartment and the first height is the height of the compartment closest to the exterior perimeter of the tray and the second height is the height of the highest side of the compartment and is the height of the compartment farthest from the exterior perimeter of the tray,
        wherein the range of rotation is from 1 to about 30 degrees in either a clockwise or counter-clockwise direction.

2. The system of claim 1, wherein each pot has one vertical plane of symmetry.

3. The system of claim 2, wherein each compartment has one vertical plane of symmetry.

4. The system of claim 1, wherein each pot has no vertical planes of symmetry.

5. The system of claim 4, wherein each compartment has no vertical planes of symmetry.

6. The system of claim 1, wherein the multi-compartment tray has at least six compartments.

7. The system of claim 1, wherein the shape of at least the lower twenty percent of at least one compartment is substantially similar to a part of the outer shape of the pot, thereby permitting the pot to nest in the compartment.

8. The system of claim 1, wherein each pot has sides that are a uniform height.

9. The system of claim 1, wherein the sides of the pot are from 0 to 10 mm from the sides of the compartment.

10. The system of claim 1, wherein each of said compartments has a compartment base and each of said pots has a pot base, and the base of each compartment has a first three dimensional contour and the base of each pot has a second three dimensional contour, wherein said first three dimensional contour has at least one raised element and said second three dimensional contour has at least one recessed element, wherein the at least one raised element of the first three dimensional contour and the at least one recessed element of the second three dimensional contour may be coupled.

11. The system of claim 1, wherein each pot contains a label and said label is oriented toward the outer perimeter of the tray.

12. The system of claim 1, wherein said physical barrier prevents rotation of the pot by more than 10 degrees in either a clockwise or counter-clockwise direction.

13. The system of claim 1, wherein each pot has sides that form the body portion, and over the range of the sides there is no cross-section that is a circle, a square, an ellipse or a rectangle.

14. The system of claim 13, wherein each compartment has sides and over the range of the sides there is no cross-section that is a circle, a square, an ellipse or a rectangle.

15. The system of claim 1, wherein said lowest side of each compartment is at least 20% of that of the pot located in the compartment.

16. The system of claim 15, wherein said lowest side of each compartment is at least 30% of that of the pot located in the compartment.

17. The system of claim 16, wherein said lowest side of each compartment is at least 50% of that of the pot located in the compartment.

18. The system of claim 1, wherein there are at least four compartments, and the plurality of compartments are arranged in at least two rows.

19. The system of claim 1, wherein the physical barrier prevents the pot from rotating by more than about 1 degree, in either a clockwise or counter-clockwise direction.

20. The system of claim 1, wherein the physical barrier prevents the pot from rotating by more than about 2 degrees, in either a clockwise or counter-clockwise direction.

21. The system of claim 1, wherein the physical barrier prevents the pot from rotating by more than about 3 degrees, in either a clockwise or counter-clockwise direction.

22. The system of claim 1, wherein the physical barrier prevents the pot from rotating by more than about 4 degrees, in either a clockwise or counter-clockwise direction.

23. The system of claim 1, wherein the physical barrier prevents the pot from rotating by more than about 5 degrees, in either a clockwise or counter-clockwise direction.

24. The system of claim 1, wherein the physical barrier prevents the pot from rotating by more than about 20 degrees, in either a clockwise or counter-clockwise direction.

25. The system of claim 1, wherein the physical barrier prevents the pot from rotating by more than about 25 degrees, in either a clockwise or counter-clockwise direction.

* * * * *